United States Patent [19]

Nagashima et al.

[11] 4,191,269
[45] Mar. 4, 1980

[54] VEHICLE BODY FRAME ARRANGEMENT

[75] Inventors: Tomoyuki Nagashima, Tokorozawa; Masayuki Tanaka, Wako; Shigeo Shinomiya, Asaka, all of Japan

[73] Assignee: Honda Giken Kogyo Kabushiki Kaisha, Tokyo, Japan

[21] Appl. No.: 923,945

[22] Filed: Jul. 11, 1978

[30] Foreign Application Priority Data

Jul. 15, 1977 [JP] Japan .............................. 52-93469[U]

[51] Int. Cl.² ....................... B62D 21/04; B62K 19/10
[52] U.S. Cl. ................................180/217; 280/281 R; 280/282
[58] Field of Search ...................... 180/25 R, 27, 33 B, 180/33 A; 280/282, 281 R, 281 B, 288

[56] References Cited

U.S. PATENT DOCUMENTS 3,512,599  5/1970  Hott et al. ............................... 180/27
3,826,530  7/1974  Hoffmeyer et al. .................. 280/282

FOREIGN PATENT DOCUMENTS 236901  7/1945  Switzerland ........................... 180/25 R Primary Examiner—Joseph F. Peters, Jr.
Assistant Examiner—Donn McGiehan
Attorney, Agent, or Firm—Haseltine, Lake & Waters

[57] ABSTRACT

A vehicle body frame arrangement comprising a pair of left and right side plates interconnected by a laterally extending pipe member receiving a wheel shaft. The side plates are fixedly mounted on the lower side of a longitudinal main pipe to form a vehicle body frame. A chain cover is mounted on the outside of one side plate, and houses a chain sprocket mounted on the wheel shaft and a chain engaged with the sprocket. A brake cover is mounted on the outside of the other plate and houses a brake drum mounted on the wheel shaft and brake shoes engageable with the shaft.

5 Claims, 4 Drawing Figures

VEHICLE BODY FRAME ARRANGEMENT

BACKGROUND OF THE INVENTION

This invention relates to a vehicle body frame arrangement mainly applicable to a tricycle for off-road operation.

Generally, it is required for a tricycle of this kind that the vehicle body frame thereof be light in weight.

SUMMARY OF THE INVENTION

An object of this invention is to prove a body frame arrangement satisfying this requirement.

According to this invention, the frame arrangement comprises a pair of left and right side plates interconnected by a lateral pipe member receiving a wheel shaft, the side plates being fixedly secured to the lower side of a longitudinal main pipe so as to form a vehicle body frame, a chain cover secured to one of the side plates to form a compartment housing a chain sprocket mounted on the wheel shaft and a chain engaged with the wheel shaft, and a second cover secured to the other side plate to form a second compartment housing both a brake drum mounted on the wheel shaft and brake shoes engageable with the shaft.

DETAILED DESCRIPTION

Figure 1:
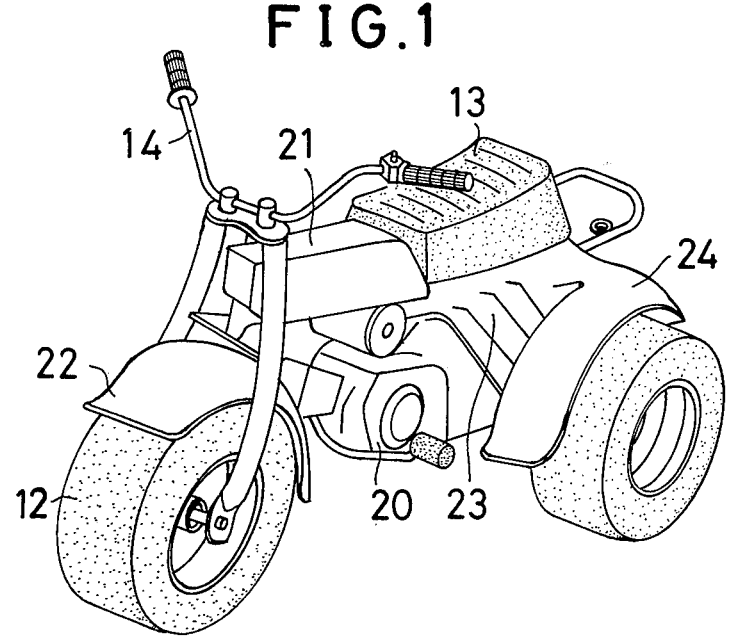
FIG. 1 is a perspective view of one embodiment of a tricycle having the frame arrangement according to the invention.
Figure 2:
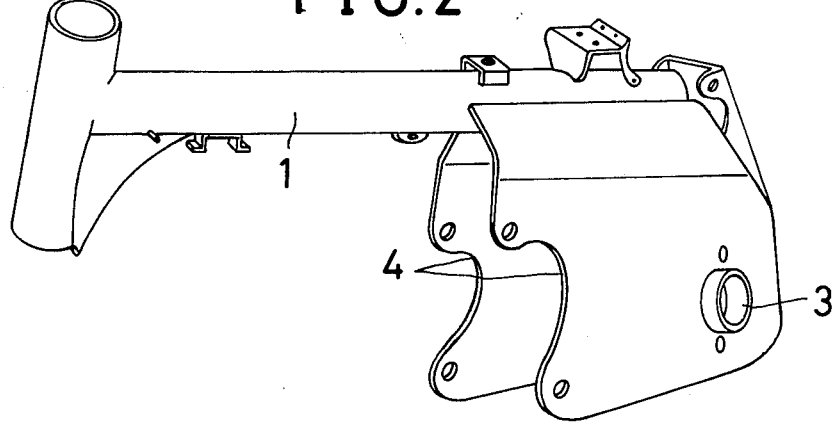
FIG. 2 is a perspective view of a major part of the frame arrangement.
Figure 4:
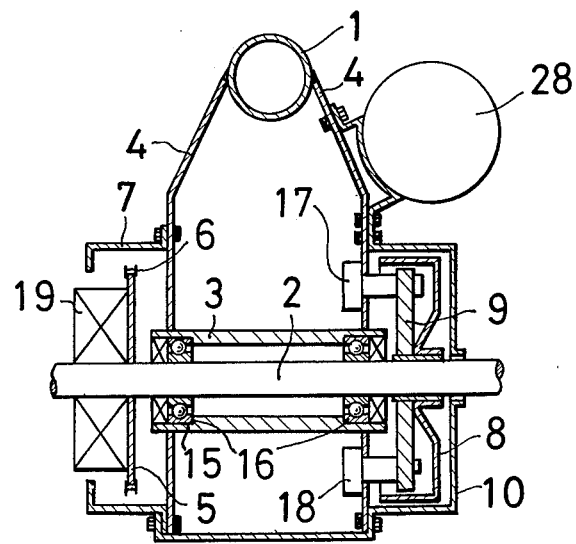
FIG. 4 is a sectional view taken along line IV—IV in FIG. 3.
Figure 3:
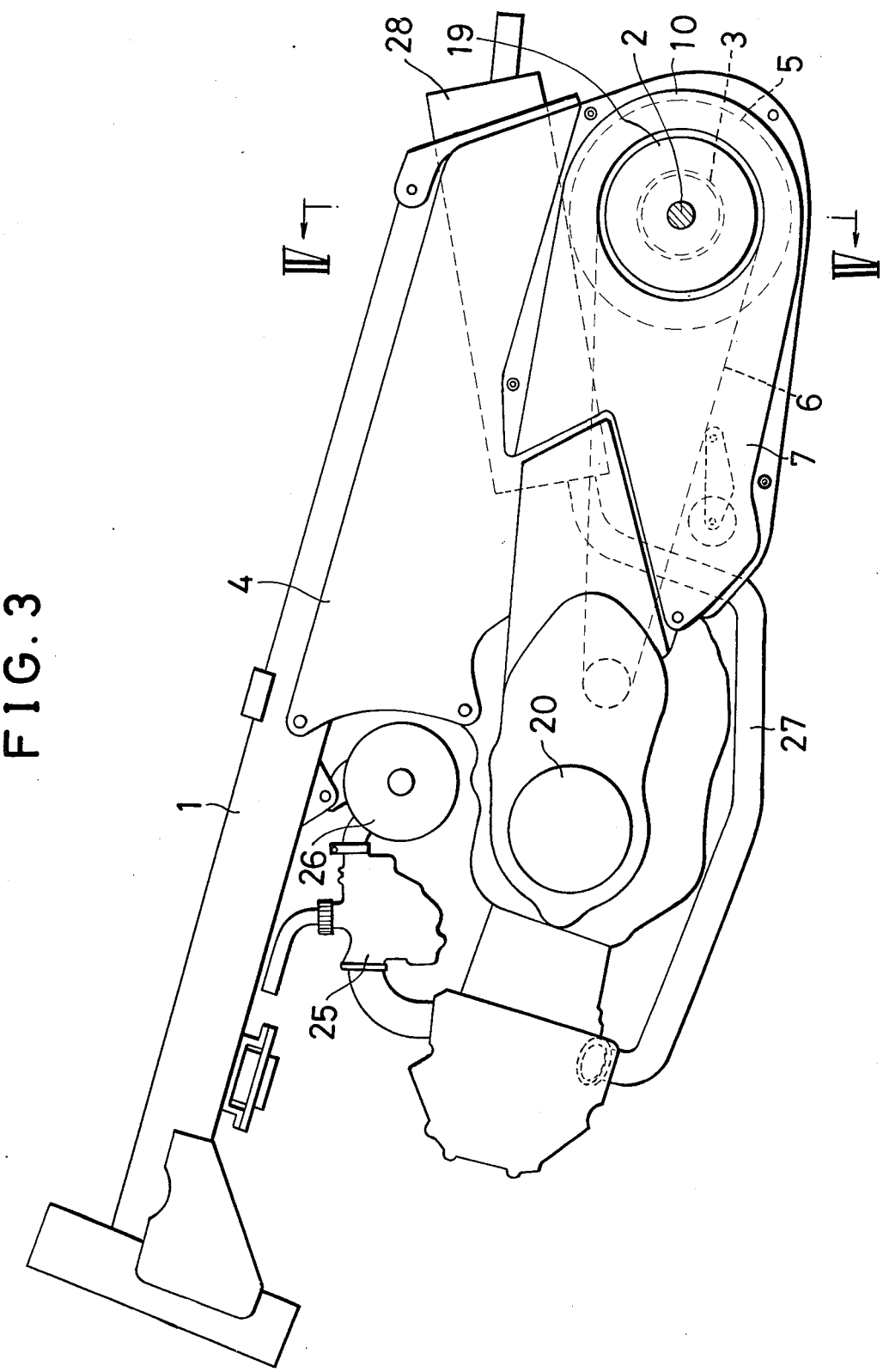
FIG. 3 is an enlarged side view of a major portion of this frame arrangement.

The drawings are directed to an embodiment of a frame arrangement for an off-road tricycle. The tricycle comprises a frame arrangement including a main longitudinal pipe 1 and a wheel shaft 2 passing through a pipe member 3. A pair of left and right side plates 4 are positioned at the rear part of the main pipe 1 and extend downwards therefrom, the wheel shaft 2 being inserted through the pipe member 3 extending between the side plates 4. The shaft 2 supports rear wheels 11 at its respective ends.

Numeral 12 denotes a single front wheel supported in front of and below the main pipe 1. An internal combustion engine 20 is mounted below a middle portion of the main pipe 1, and the engine 20 is attached to the front of the side plates 4. A driver's seat 13 is mounted above the engine 20 and a steering handle 14 is provided in front of the seat 13.

More particularly, the pipe member 3 is mounted in respective openings 15 previously made in the left and right side plates 4 and are fixed thereto by welding. The pipe member is provided, at its interior and at both end portions, with respective ball bearings 16 and the wheel shaft 2 is inserted through the bearings 16 for being supported thereby. The side plates 4 serve as inner panels cooperating with respective covers 7 and 10 to form compartments therewith. Namely, the side plate 4 positioned inside the cover 10 is utilized as an attaching plate for a brake cam 17 and a brake anchor 18, and brake shoes 9 accommodated in the compartment between cover 10 and side plate 4 are operatively engaged with the cam 17 and anchor 18 for acting on brake drum 8 also accommodated in the compartment. At the other side, the cover 7 and the side plate define a second compartment housing sprocket 5 mounted on wheel shaft 2 and chain 6 on sprocket 5. A sprocket damper 19 is interposed between the wheel shaft 2 and the chain sprocket 5.

A fuel tank 21 is mounted in front of the driver's seat 13. Numeral 22 denotes a front fender and numeral 23 denotes a rear cover attached to the upper surface of the rear part of the main pipe 1, and a pair of rear fenders 24 project integrally from cover 23.

Numeral 25 denotes a carburetor, numeral 26 denotes an air cleaner, numeral 27 denotes an exhaust pipe and numeral 28 denotes a muffler.

Thus, according to the invention, the vehicle body frame is composed of the longitudinal main pipe 1 and the pair of left and right side plates interconnected through the lateral pipe member 3, so that the assembly thereof can be made simple in construction and light in weight, and additionally the side plates 4 support the respective covers 7 and 10 in such a manner that the chain sprocket 5 and the chain 6 are housed within one of the covers and the brake drum 8 and the brake shoes 9 are housed within the other of the covers, so that the respective side plates 4 can be utilized as inner panels cooperating with the respective covers 7,10 and can serve advantageously for decreasing its weight.

What is claimed is:

1. A vehicle body frame arrangement comprising a main longitudinal pipe member, a pair of left and right side plates secured to said main pipe and depending therefrom in spaced relation, a lateral pipe member secured to said side plates, a wheel shaft rotatably supported in said lateral pipe member and projecting beyond the ends thereof, a first cover member secured to one of said side plates to form a first compartment therewith, a chain sprocket and chain mounted on said wheel shaft and accommodated in said first compartment, a second cover member secured to the other of said plates to form a second compartment therewith, and brake means mounted in said second compartment for applying braking force to said wheel shaft, said brake means comprising a brake drum on the wheel shaft and brake shoes supported by the other of said plates.

2. A vehicle body frame arrangement comprising a main longitudinal pipe member, a pair of left and right side plates secured to said main pipe and depending therefrom in spaced relation, a lateral pipe member secured to said side plates, bearings in said lateral pipe member, a wheel shaft rotatably supported in said bearings in said lateral pipe member and projecting beyond the ends thereof, a first cover member secured to one of said side plates to form a first compartment therewith, a chain sprocket and chain mounted on said wheel shaft and accommodated in said first compartment, a second cover member secured to the other of said plates to form a second compartment therewith, and brake means mounted in said second compartment for applying braking force to said wheel shaft.

3. A vehicle body frame arrangement as claimed in claim 2 wherein said bearings are located in the vicinity of said side plates.

4. A vehicle body frame arrangement comprising a main longitudinal pipe member, a pair of left and right side plates secured to said main pipe and depending therefrom in spaced relation, a lateral pipe member secured to said side plates, a wheel shaft rotatably supported in said lateral pipe member and projecting beyond the ends thereof, a first cover member secured to one of said side plates to form a first compartment therewith, a chain sprocket and chain mounted on said wheel shaft and accommodated in said first compartment, a second cover member secured to the other of said plates to form a second compartment therewith, and brake means mounted in said second compartment for applying braking force to said wheel shaft, said side plates extending beyond said covers for attachment of auxiliary apparatus thereto.

5. A vehicle body frame arrangement comprising a main longitudinal pipe member, a pair of left and right side plates secured to said main pipe and depending therefrom in spaced relation, a lateral pipe member welded to said side plates, a wheel shaft rotatably supported in said lateral pipe member and projecting beyond the ends thereof, a first cover member secured to one of said side plates to form a first compartment therewith, a chain sprocket and chain mounted on said wheel shaft and accommodated in said first compartment, a second cover member secured to the other of said plates to form a second compartment therewith, and brake means mounted in said second compartment for applying braking force to said wheel shaft.

* * * * *